United States Patent
Krumm et al.

(10) Patent No.: US 9,443,326 B2
(45) Date of Patent: Sep. 13, 2016

(54) SEMANTIC PLACE LABELS

(71) Applicant: Microsoft Corporation, Redmond, WA (US)

(72) Inventors: John C. Krumm, Redmond, WA (US); Dany Rouhana, Redmond, WA (US); Ming-Wei Chang, Redmond, WA (US); Aman Kansal, Redmond, WA (US); Piali Choudhury, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 14/101,937

(22) Filed: Dec. 10, 2013

(65) Prior Publication Data

US 2015/0161439 A1  Jun. 11, 2015

(51) Int. Cl.
*G06K 9/30* (2006.01)
*G06T 11/00* (2006.01)
*G06K 9/00* (2006.01)
*G06K 9/62* (2006.01)

(52) U.S. Cl.
CPC .......... *G06T 11/00* (2013.01); *G06K 9/00624* (2013.01); *G06K 9/6218* (2013.01); *G06K 9/6256* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 8,135,505 B2 | 3/2012 | Vengroff et al. | |
| 8,200,247 B1* | 6/2012 | Starenky et al. | 455/456.3 |
| 8,229,458 B2* | 7/2012 | Busch | 455/456.1 |
| 2002/0057678 A1* | 5/2002 | Jiang | H04L 12/5895 370/353 |
| 2006/0025158 A1* | 2/2006 | Leblanc et al. | 455/456.2 |
| 2006/0251338 A1* | 11/2006 | Gokturk et al. | 382/305 |
| 2007/0244633 A1* | 10/2007 | Phillips et al. | 701/207 |
| 2009/0252413 A1* | 10/2009 | Hua et al. | 382/170 |
| 2010/0223346 A1* | 9/2010 | Dragt | 709/206 |
| 2010/0257036 A1* | 10/2010 | Khojastepour et al. | 705/14.11 |
| 2011/0010093 A1 | 1/2011 | Partridge et al. | |
| 2011/0029562 A1* | 2/2011 | Whitby et al. | 707/779 |
| 2011/0076653 A1* | 3/2011 | Culligan et al. | 434/157 |
| 2011/0099048 A1* | 4/2011 | Weiss et al. | 705/7.34 |
| 2012/0246004 A1* | 9/2012 | Book et al. | 705/14.58 |
| 2012/0264446 A1* | 10/2012 | Xie et al. | 455/456.1 |

(Continued)

OTHER PUBLICATIONS

Lin, et al., "Modeling People's Place Naming Preferences in Location Sharing", In Proceedings of the 12th ACM International Conference on Ubiquitous Computing, Sep. 26, 2010, 10 pages.

(Continued)

*Primary Examiner* — Shervin Nakhjavan
(74) *Attorney, Agent, or Firm* — Alin Corie; Sandy Swain; Micky Minhas

(57) ABSTRACT

The subject disclosure is directed towards automatically labeling location-related information such as corresponding to GPS data or the like with a semantic label. A classifier trained with machine learning is provided with feature data corresponding to the location-related information and other features, such as user demographics data of a person associated with location-related information. The semantic label is received from the classifier, and associated with the location-related information. Other features may be used, such as other egocentric features corresponding to a person's particular visit, features from a sequence of visits, and/or features from other user information. The semantic label may be used to trigger an action, label a location on a map or the like, and so on.

19 Claims, 10 Drawing Sheets

(56) References Cited

U.S. PATENT DOCUMENTS

| | | | |
|---|---|---|---|
| 2013/0225202 A1* | 8/2013 | Shim et al. | 455/456.3 |
| 2013/0226857 A1* | 8/2013 | Shim et al. | 706/52 |
| 2014/0140675 A1* | 5/2014 | de Sa | H04N 21/21805 386/223 |
| 2014/0150042 A1* | 5/2014 | Pacor | H04N 21/21805 725/116 |
| 2015/0019710 A1* | 1/2015 | Shaashua | H04L 43/10 709/224 |

OTHER PUBLICATIONS

Bicocchi, et al., "Supporting Location-Aware Services for Mobile Users with the Whereabouts Diary", In Proceedings of the 1st International Conference on Mobile Wireless Middleware, Operating Systems, and Applications, Feb. 12, 2008, 9 pages.

Do, et al., "The Places of Our Lives: Visiting Patterns and Automatic Labeling from Longitudinal Smartphone Data", In IEEE Transactions on Mobile Computing, vol. PP, Issue 99, Feb. 4, 2013, 12 pages.

Aipperspach, et al., "A Quantitative Method for Revealing and Comparing Places in the Home", In Proceedings of the 8th International Conference on UbiComp, Sep. 17, 2006, 18 pages.

Sae-Tang, et al., "Semantic Place Prediction using Mobile Data", In Mobile Data Challenge (by Nokia) Workshop, Jun. 18, 2012, 6 pages.

Viswanathan, et al., "Automated Spatial-Semantic Modeling with Applications to Place Labeling and Informed Search", In Canadian Conference on Computer and Robot Vision, May 25, 2009, 8 pages.

Bhattacharya, et al., "SerPens—A Tool for Semantically Enriched Location Information on Personal Devices", In Proceedings of the ICST 3rd International Conference on Body Area Networks, Mar. 13, 2008, 2 pages.

Miluzzo, et al., "CenceMe—Injecting Sensing Presence into Social Networking Applications", In Proceedings of the 2nd European Conference on Smart Sensing and Context, Oct. 23, 2007, 28 pages.

Ye, et al., "On the Semantic Annotation of Places in Location-Based Social Networks", In Proceedings of the 17th ACM SIGKDD International Conference on Knowledge Discovery and Data Mining, Aug. 21, 2011, 9 pages.

Partridge, et al., "On Using Existing Time-Use Study Data for Ubiquitous Computing Applications", In Proceedings of the 10th International Conference on Ubiquitous Computing, Sep. 21, 2008, 10 pages.

"American Time Use Survey", Retrieved on: Aug. 28, 2013, 5 pages. Available at: http://www.bls.gov/tus/.

Zhu, et al., "Nokia Mobile Data Challenge: Predicting Semantic Place and Next Place via Mobile Data", In Workshop of Mobile Data Challenge, Jun. 18, 2012, 6 pages.

Kim, et al., "Employing User Feedback for Semantic Location Services", In Proceedings of the 13th International Conference on Ubiquitous Computing, Sep. 17, 2011, 10 pages.

Phithakkitnukoon, et al., "Activity-Aware Map: Identifying Human Daily Activity Pattern Using Mobile Phone Data", In First International Workshop on Human Behavior Understanding, Aug. 22, 2010, 13 pages.

Wolf, et al., "Elimination of the Travel Diary: An Experiment to Derive Trip Purpose From GPS Travel Data", In Journal of Transportation Research Board, Jan. 7, 2001, 24 pages.

Liao, et al., "Extracting Places and Activities from GPS Traces Using Hierarchical Conditional Random Fields", In Journal of International Journal of Robotics Research, vol. 26, Issue 1, Jan. 2007, 20 pages.

Chen, et al., "A Supervised Learning based Semantic Location Extraction Method using Mobile Phone Data", In IEEE International Conference on Computer Science and Automation Engineering, vol. 3, May 25, 2012, 4 pages.

Laurila, et al., "The Mobile Data Challenge: Big Data for Mobile Computing Research", In Proceedings of the Mobile Data Challenge by Nokia Workshop, Jun. 2012, 8 pages.

Montoliu, et al., "Semantic Place Prediction by Combining Smart Binary Classifiers", In Proceedings of the Mobile Data Challenge by Nokia Workshop, Jun. 18, 2012, 6 pages.

Zhu et al. "Feature Engineering for Place Category Classification", In Proceedings of the Mobile Data Challenge by Nokia Workshop, Jun. 18, 2012, 6 pages.

Huang, et al., "Mining Users' Behaviors and Environments for Semantic Place Prediction", In Proceedings of the Mobile Data Challenge by Nokia Workshop, Jun. 18, 2012, 6 pages.

"Puget Sound 2006 Household Activity Survey", Retrieved on: Aug. 28, 2013, 1 page Available at: http://www.psrc.org/data/surveys/2006-household/.

Friedman, Jerome H., "Greedy Function Approximation: A Gradient Boosting Machine", In the Annals of Statistics, vol. 29, Issue 5, Oct. 2001, 45 pages.

Marmasse, et al., "Location-Aware Information Delivery with comMotion", In Proceedings of the 2nd International Symposium on Handheld and Ubiquitous Computing, Sep. 25, 2000, 15 pages.

Ashbrook, et al., "Learning Significant Locations and Predicting User Movement with GPS", In Sixth International Symposium on Wearable Computers, Oct. 7, 2002, 8 pages.

Kang, et al., "Extracting Places from Traces of Locations", In Proceedings of the 2nd ACM International Workshop on Wireless Mobile Applications and Services on WLAN Hotspots, Oct. 1, 2004, 9 pages.

Hightower, et al., "Learning and Recognizing the Places We Go", In Proceedings of the 7th International Conference on Ubiquitous Computing, Sep. 11, 2005, 18 pages.

Caoy, et al., "Mining Significant Semantic Locations from GPS Data", In Proceedings of the 36th International Conference on Very Large Data Bases, vol. 3, Issue 1-2, Sep. 2010, 12 pages.

Diggelen, Frank Van, "GNSS Accuracy: Lies, Damn Lies and Statistics", In GPS World, vol. 18, Issue 1, Jan. 2007, 4 pages.

Weisstein, Eric, "Normal Difference Distribution", Retrieved on: Aug. 28, 2013, 1 page. Available at: http://mathworld.wolfram.com/NormalDifferenceDistribution.html.

Patterson, et al., "Inferring High-Level Behavior from Low-Level Sensors", In Ubiquitous Computing, 5th International Conference, Oct. 12, 2003, 18 pages.

* cited by examiner

SEMANTIC PLACE LABELS

BACKGROUND

GPS (global positioning system) and other location data, such as obtained from cellular phone towers, are not in a form that is easy for humans to understand. People typically do not think in terms of numerical coordinates, latitude/longitude or even street addresses, but rather tend to better understand friendly names for locations.

Semantic place labeling refers to the process of giving a meaningful name to a location. Examples of semantic place labels are labels like "home," "work," "gym" and "school" and other geographic locations where a person spends time. Such labels not only provide understandable location information to people, but often allow for automatically inferring activities. For instance, sleep or family dinners usually occur at home rather than at work or school, (although there are exceptions).

Existing technologies compute semantic labels with heuristics, which are difficult to program reliably. For example, a "home" may be identified as where a person spends the most time during the hours of 12:00 a.m. to 6:00 a.m., but this does not apply to many people, such as those who work nights. It is cumbersome and highly error-prone to write heuristics that sufficiently cover the large number of possible cases and places. Classification based upon similar rules, along with manual labeling by other users, has the same drawbacks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards labeling location-related information with a semantic label. Feature data corresponding to the location-related information is provided to a classifier trained via machine learning. The feature data may include user demographics data of a person associated with location-related information. The semantic label is received from the classifier, and associated with the location-related information.

In one or more aspects, labeling logic comprises a classifier trained with machine learning, in which the labeling logic is configured to label a visit with a semantic label based upon features of the visit. The visit corresponds to location-related data and one or more egocentric features.

One or more aspects are directed towards obtaining feature data associated with a plurality of location-related data corresponding to a plurality of visits, which may be a sequence of visits. The location-related data corresponding to at least one visit is classified into semantic label data for that visit.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically labeling a person's visits to significant places with semantic labels, such as home, work, school, gym and so on. The labeling may be based on a stored log of a person's locations, such as measured by a GPS logger and/or other-location related data. To this end, labeling is based upon an automated classification problem that classifies locations into different label categories based on individual demographics, the timing of visits, and/or nearby businesses.

In one or more aspects, a semantic place labeler may be trained via machine learning on a large repository of existing diary data to create label inferences. Feedback from users may be used to further improve label accuracy.

The classifier is trained to compute the labels. In general, the classifier is trained with the features of persons' visits to places, wherein a visit is when a user spends time at a (clustered) location. Example non-limiting features of a visit may include user demographics data (e.g., gender and/or age), the time of day of the arrival, day of week, season, duration of stay, whether or not the visit is during a holiday, and nearby businesses.

In other aspects, the inference accuracy may be improved by processing sequences of place labels rather than just individual labels. More particularly, to improve accuracy, a system may classify a sequence of visits and/or features extracted therefrom rather than only classifying individual visits from individual visit features. For instance, it may be rare for a person to visit a gym more than once per day, and thus processing a sequence of visit inferences may correct classification errors.

It should be understood that any of the examples herein are non-limiting. For instance, the feature data that is exemplified, the type of classifier and/or the user interfaces depicted are only examples of many possible alternatives. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and location-related data processing in general.

Figure 1:
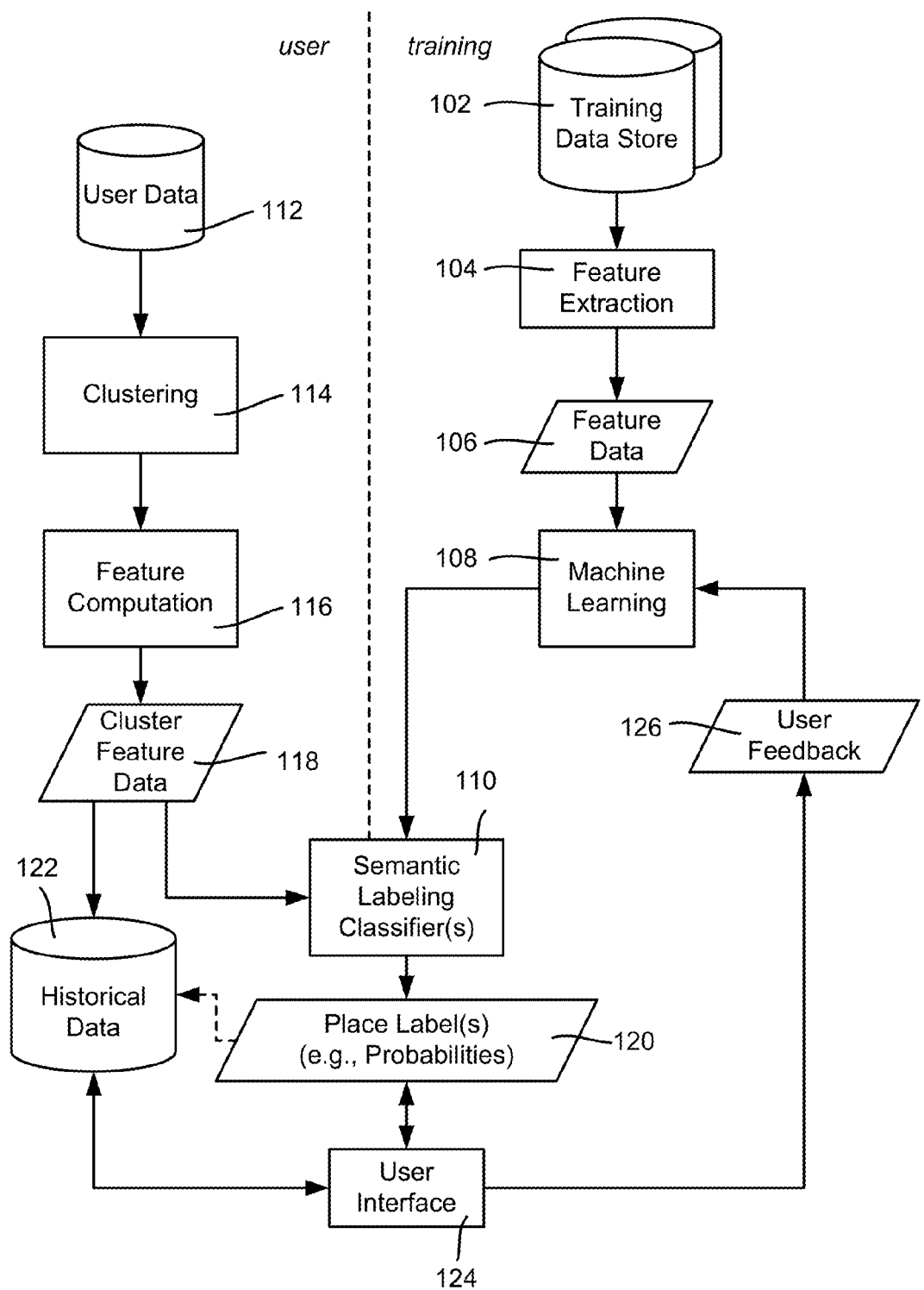
FIG. 1 is a block diagram illustrating example components directed towards machine learning-based classification for semantic place labels according to one or more example implementations.

FIG. 1 is a block diagram illustrating an example embodiment directed towards automatic place labeling with semantic place labels as described herein. One or more training data stores 102 are processed by a feature extractor 104 that extracts feature data 106 from the data in the data store or stores 102. The feature data 106 is then used in machine learning (block 108) to provide a semantic label classifier 110.

In one or more implementations, machine learning is based upon boosted decision trees, however as is understood, other types of classifiers with corresponding machine learning may be used. With boosted decision trees, the mapping between the feature vector and place label is computed with a learned multiclass classifier in the form of a forest of boosted decision trees. The learning process begins with learning a conventional decision tree, and using the classification results from this tree, a second tree is learned with increased importance given to the training samples that were misclassified by the first tree. More trees are added in this way to create the forest. Given a feature vector, the forest gives a probability for each class, with the highest probability class taken as the inference. In one implementation, parameters include: maximum branching factor=20, minimum instances per leaf=10, learning rate=0.2 and number of trees=100.

In one or more implementations, the (non-limiting, example) training data stores 102 comprise government diary studies where participants kept track of where they went, including American Time Use Survey (ATUS) and/or Puget Sound Regional Council (PSRC) 2006 Household Activity Survey datasets. These are examples of diary surveys that similarly exist in many countries. Part of the datasets may be used for testing. With ATUS, for each participant (user), the gender and age was known, and for each place a user visited, the user gave the semantic type (label) of the place and the timing of the visit; similar labels may be combined depending on the desired level of distinction, e.g., ATUS had eleven different transportation labels that in one or more implementations may be categorized into a single "transportation" label. The PSRC dataset contained similar data and further included the latitude/longitude of the participants' destinations, which may be used to compute additional features, such as features associated with businesses near each visit.

Non-limiting examples of various extracted baseline feature data include age of subject in integer years, gender of subject, arrival day of week, arrival time of day, visit midpoint time of day, departure time of day, duration of visit, holiday (binary yes or no) and season of year (0, 1, 2, 3). Note that some of the features are redundant in that they can be computed from each other; further, some of these features may be combined into new features.

With respect to processing logged user data 112 as also represented in FIG. 1, the various logged GPS coordinates and/or other associated data may be clustered into "visits" that are likely indicative of a significant place to which the user traveled. In general, finding clusters of location points (e.g. GPS points) where a person spends time helps to identify places that are significant to that person, while reducing the amount of data to process by clustering data together that is typically is in the same general place. These clusters are then labeled.

Hierarchical/agglomerative clustering 114 is one known technique that may be used, in which each GPS point (having its own cluster point) is initially considered an individual cluster. The two geographically nearest clusters are merged into a new cluster with the two constituent clusters deleted. Such merging continues until the clusters are a specified threshold distance apart, e.g., 100 meters.

This general technique may be enhanced/modified, such as to account for the warm-up time for GPS. If the GPS logger turned off with a car's cigarette lighter, for example, then it takes time (e.g., on the order of up to a minute) to start logging on the next trip as the vehicle drives away from its last visit. Even if the GPS stays on, there can be a similar delay if the vehicle is parked where it loses its view of the GPS satellites, such as a parking garage. To account for these situations, the most recent latitude/longitude point after each gap in logging that exceeded the sampling time (e.g., ten seconds) may be artificially repeated. This has the effect of inserting a GPS point close to the time and place of a departure after being parked.

Another modification may be used to ignore GPS points where the person is in a moving vehicle. This helps avoid small clusters on roads and decreases the processing time required for clustering. A general idea is to use only the pairs of GPS points that likely came from a GPS logger while stationary. Intuitively, points measured from the same location are likely to be closer together than points measured from different locations. To detect such pairs of temporally adjacent points measured from the same location, a distance threshold is determined in which only pairs of points whose distance between them is less than this threshold are retained as likely coming from a non-moving GPS logger.

To identify such points, GPS noise is modeled as a two-dimensional Gaussian. The standard deviation of the error in the GPS loggers used was estimated at approximately σ=4 meters. Because of this error, multiple measurements from a non-moving logger change from one sample to the next. The distance between two points measured from the same location may be modeled; the probability distribution of the distance between two samples taken from a normal distribution is the normal difference distribution. For one-dimensional Gaussians, this distribution has a closed form; a formula for the cumulative probability distribution of the distance between two, two-dimensional points a and b with different Gaussian distributions:

$$a \sim N\left(\mu_a, \begin{bmatrix} \sigma_{a,x} & 0 \\ 0 & \sigma_{a,y} \end{bmatrix}\right) \qquad b \sim N\left(\mu_b, \begin{bmatrix} \sigma_{b,x} & 0 \\ 0 & \sigma_{b,y} \end{bmatrix}\right)$$

The cumulative probability distribution of the distance between these two random points is:

$$P(|a - b| < d) = \\ c \int_0^d \int_0^{2\pi} \exp\left\{-\left(\frac{(r\cos\theta - a_x)^2}{2(\sigma_{a,x}^2 + \sigma_{b,x}^2)} + \frac{(r\sin\theta - a_y)^2}{2(\sigma_{a,y}^2 + \sigma_{b,y}^2)}\right)\right\} r \, dr \, d\theta$$

-continued $$c = \frac{1}{2\pi\sqrt{(\sigma_{a,x}^2 + \sigma_{b,x}^2)(\sigma_{a,y}^2 + \sigma_{b,y}^2)}}$$

$$\alpha_x = \mu_{a,x} - \mu_{b,x}$$

$$\alpha_y = \mu_{a,y} - \mu_{b,y}.$$

A closed form solution for this integral is not needed, as it can be simplified. To this end, because of modeling a stationary GPS logger, $\mu_a = \mu_b$. Because the logger's noise characteristics are isotropic and do not change between sample points a and b, $\sigma_{a,x} = \sigma_{a,y} = \sigma_{b,x} = \sigma_{b,y} = \sigma$. With these simplifications, $$P(|a-b| < d) = 1 - \exp\left(-\frac{d^2}{4\sigma^2}\right).$$

This equation gives the probability that the distance between two sampled points from a stationary GPS logger will be less than d. When this probability is set to a high value such as 0.95, then d=13.85 meters when $\sigma$=4. Thus, with 95 percent probability, any pair of points measured from the same location is within a threshold distance of 13.85 meters of each other. Stated differently, taking the temporally adjacent pairs of points that are less than 13.85 meters apart theoretically gives a recall rate of 0.95 when looking for points from a non-moving logger. This may be used in clustering to filter out temporally adjacent points whose distance apart is greater than the threshold.

Once at least some of the clustering 114 including any data enhancement/modification is complete, features may be computed for the remaining clusters, as represented in FIG. 1 via feature computation 116. Cluster feature data 118 results, which is fed into the trained semantic labeling classifier 110. The result is a semantic place label 120 (e.g., a set of place labels with corresponding probabilities) for associating with each significant place that is represented by a cluster.

The cluster feature data 118 or a subset thereof and/or a derivative thereof may be stored as historical data 122, which may be associated with the place label or labels 120. A user interface 124 may present the labels to the user in some suitable, generally interactive way, e.g., as represented in the example maps of FIGS. 4 and 5. The user may, for example, access the historical data 122 augmented by semantic place labeling to review a day in the past, track where time is spent and so on. The user may provide user feedback 126 which may be used to improve machine learning, e.g., the user may correct incorrect inference data.

Figure 2:
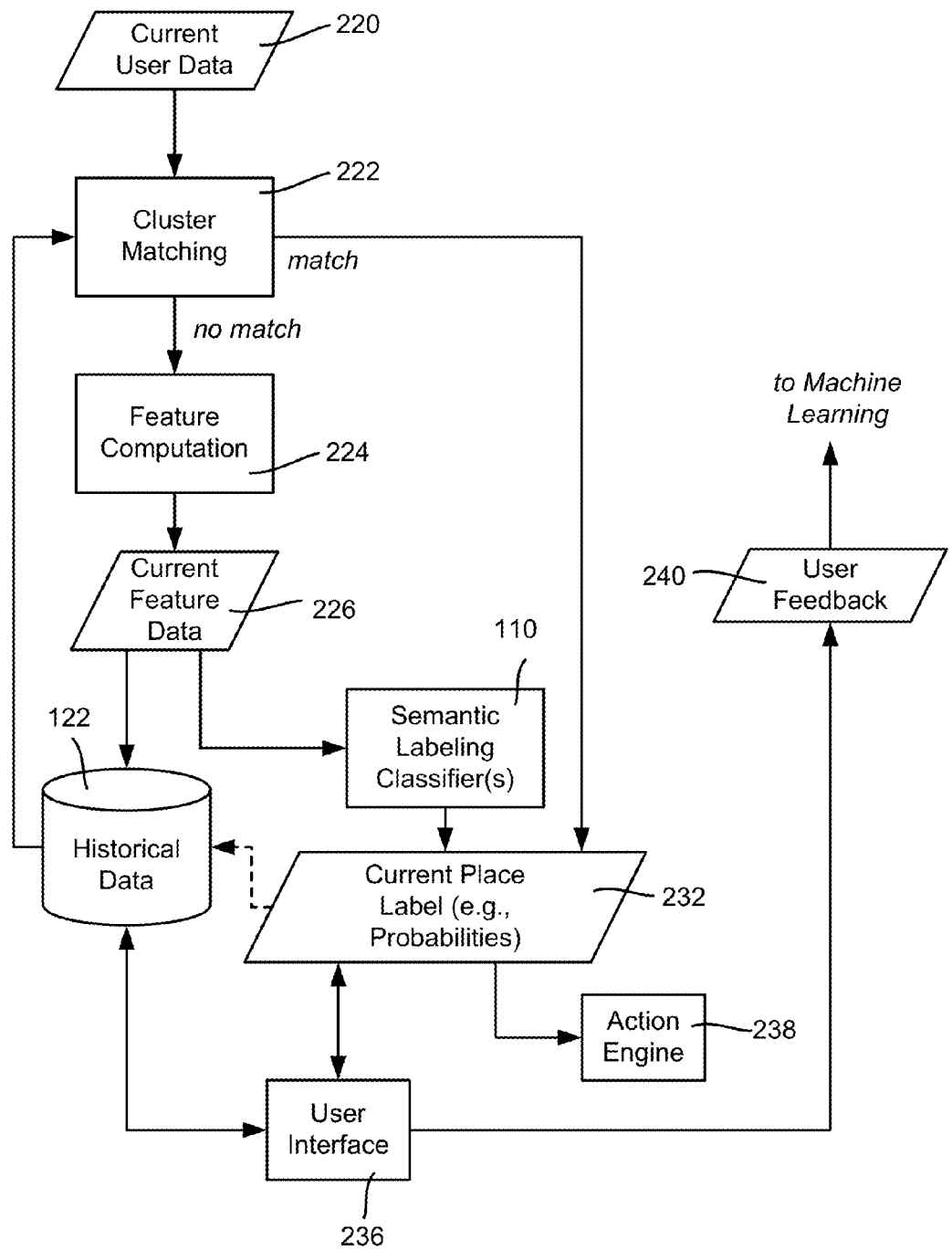
FIG. 2 is a block diagram illustrating example components directed towards online usage of semantic place labeling according to one or more example implementations.

FIG. 2 shows another usage scenario, namely one directed towards online usage. In FIG. 2, current user data 220 (e.g., GPS coordinates and/or other information) may be matched (block 222) against the historical data 122 to see if the current place matches an already-labeled cluster; (that is, once a familiar place is labeled, then there is no need for making sophisticated inferences, because geographic proximity to the labeled location is enough). If so, a current place label 232 may be output directly for the current data. If not, via feature computation 224 to provide current feature data 226 to the trained classifier 228, the current place label 232 may be inferred, and stored automatically and/or by user interaction as part of the historical data 122.

The label 232 may be used to perform an action in any number of ways, as represented in FIG. 2 by a user interface 236 and action engine 238. For example, the user interface 236 may present a map with a label on the user's current location. User feedback 240 based upon the current label may be provided for improving training.

The action engine 238 may trigger an event or set of events, such as to switch the user's device ring tone between professional or personal depending on arrival at home or work, switch calendar data from work to personal and vice-versa, boot/login a user's computer upon arrival at work, and so on. Note that a machine-readable label instead of a human-readable semantic label may be used by the action engine 238.

Moreover, the place current labeling is not limited to the user's own location. For example, based on a user's daughter's device location, a user may get a notification that his daughter arrived at school. The daughter's device may provide the label, or the notification from the daughter's device may provide the current location data that is then used via cluster matching of historical data or classification to label the place corresponding to the current location data of the daughter's device.

Figure 3:
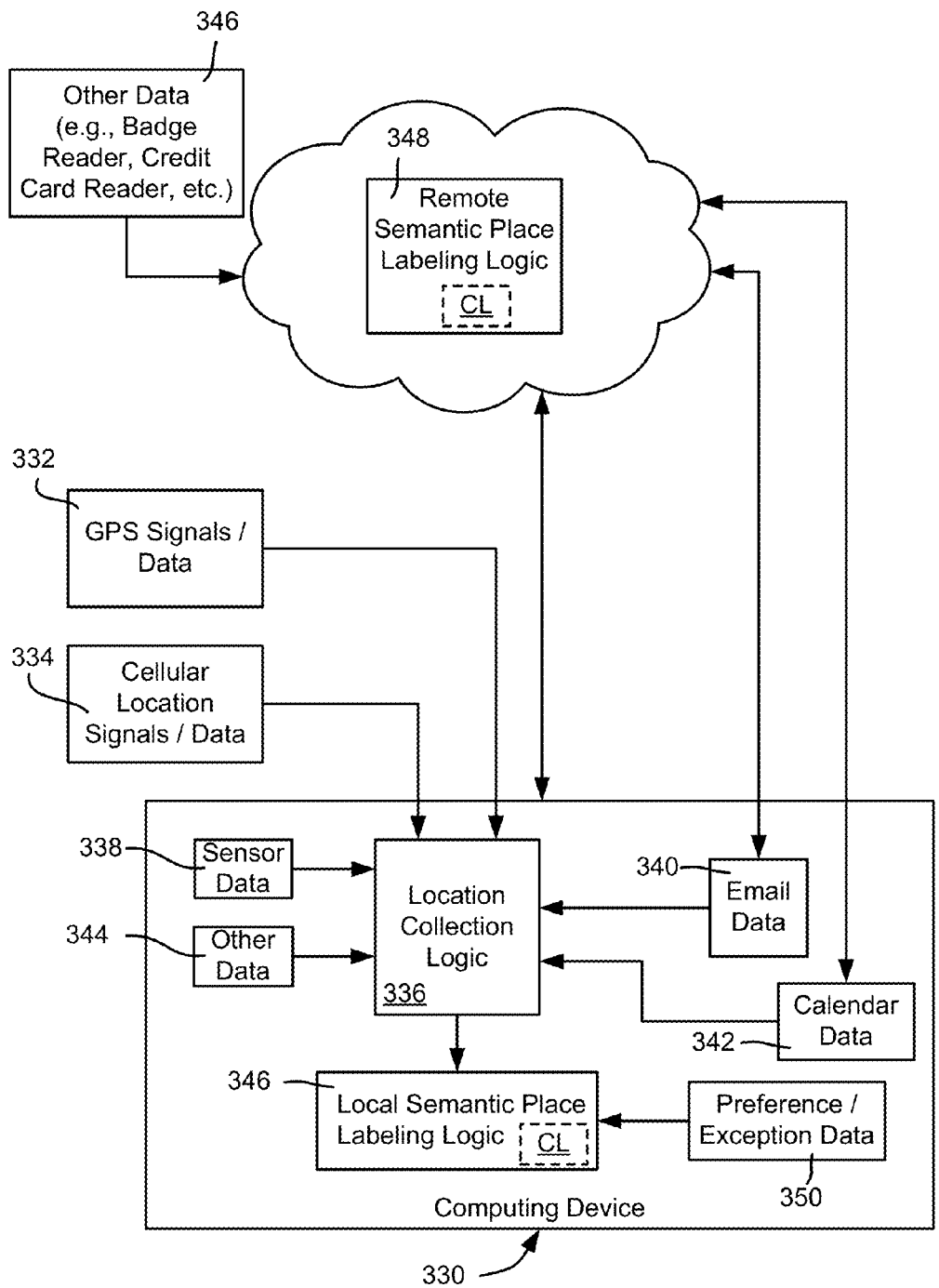
FIG. 3 is a block diagram illustrating example components that may be used to collect location-related data for use in semantic place labeling, according to one or more example implementations.

FIG. 3 shows how some of the technology may be implemented on a computing device 330 and/or as part of a larger system. Location-related data such as GPS signals 332 and/or cellular location signals 334 may be input into location collection logic 336. Note that FIG. 3 is only intended to include non-limiting examples, and is not intended to be comprehensive, nor is each component/data example shown in FIG. 3 necessary.

Further data may be used to further provide information/ evidence as to a user's current location, which, for example, may be used as features as exemplified below. These may include sensor data 338, including data from which a user's current activity may be inferred, e.g., walking, driving, exercising and so forth, which may assist in location/place determination. Other sensor data 338 that may be useful in inferring a location may include temperature, altitude, and so on. Email data 340 (and/or similar communications such as text messages, instant messages and so on) and/or calendar data 342 are other examples may be used to help infer a user's location, e.g., a user may have a meeting scheduled, lunch plans exchanged via a message and so forth. Still other data 344 that is collected includes state data such as time of day and the like.

Remotely collected data also may be useful. For example, a badge (personal identification credential) reader may provide more specific data as to which office building a user is (or was) in. A credit card swiped at a business location may indicate a user's presence at that location; similarly, payment made by a credit card, debit card, a mobile device and the like made at any location may indicate that the user frequents a business, such as a gym via a membership payment. External (e.g., internet) data such as promoting or covering a large event (e.g., a concert) may provide evidence of the user's presence at that event, as opposed to somewhere else, as may prior purchase data corresponding to buying a ticket to that event. Essentially any data that may provide a basis for feature data may be useful in classifying (or adjusting an initial classification of) the user's location as a semantically labeled place.

The various information may be fed as features or the like into semantic place labeling logic such as including the classifier described herein. The place labeling logic (or at least some part thereof, such as the classifier CL) may be local (block 346) and/or remotely located, e.g., in the cloud (block 348). Further, preference/exception data 350 (which also may be remotely maintained, at least in part) may be used to modify a classification, maintain user privacy and/or the like. For example, a user leaving a child at a day care center next to his gym (which because of their proximity to one another often gets misclassified) may set up customized user preferences/heuristics as an exception to distinguish between the two. Another user may not want a particular visit labeled, at least not correctly, for privacy reasons.

Figure 4:
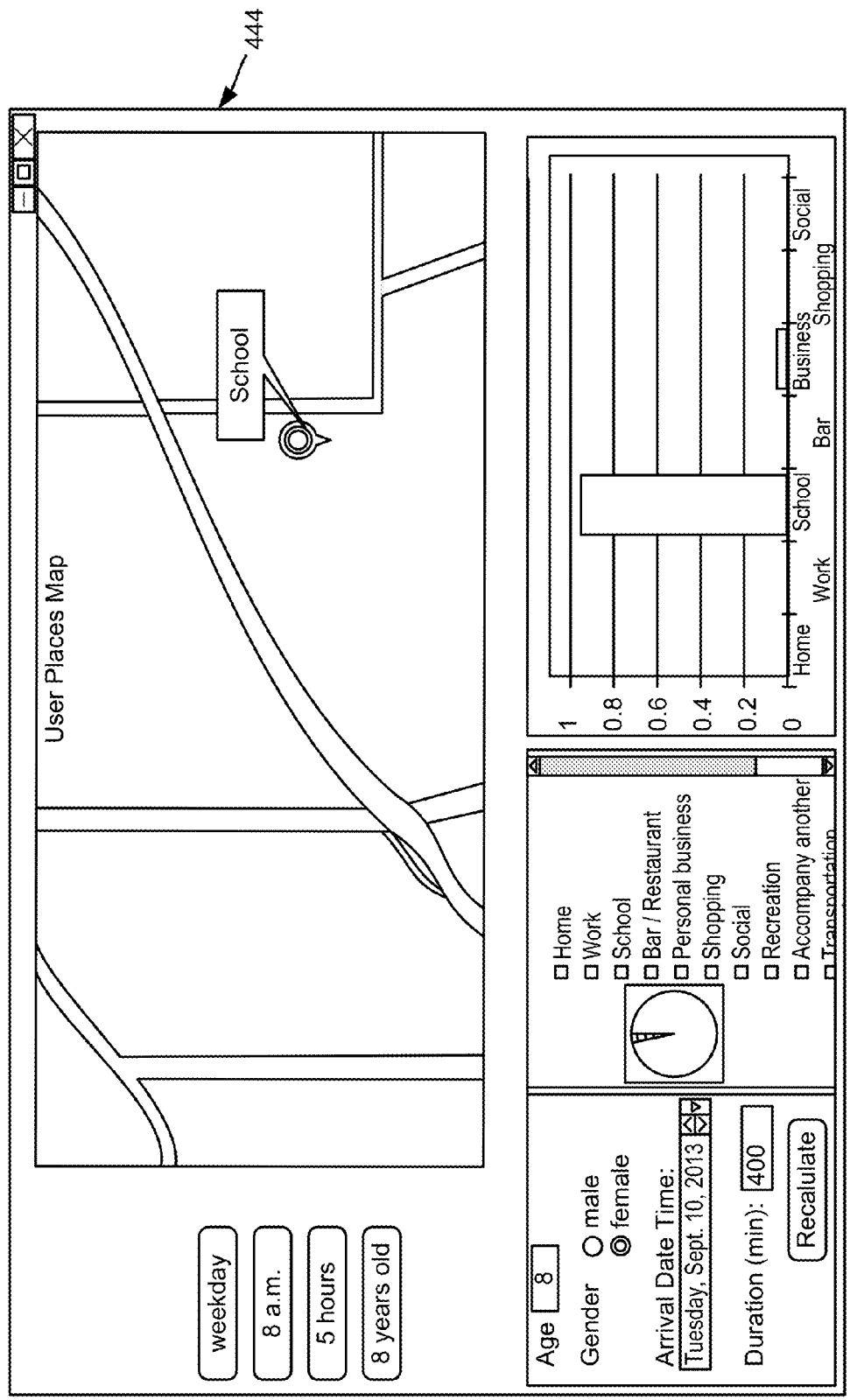
FIGS. 4 and 5 are representations of example user interfaces with which a user may interact to view semantic place labels and related data, according to one or more example implementations.
Figure 5:
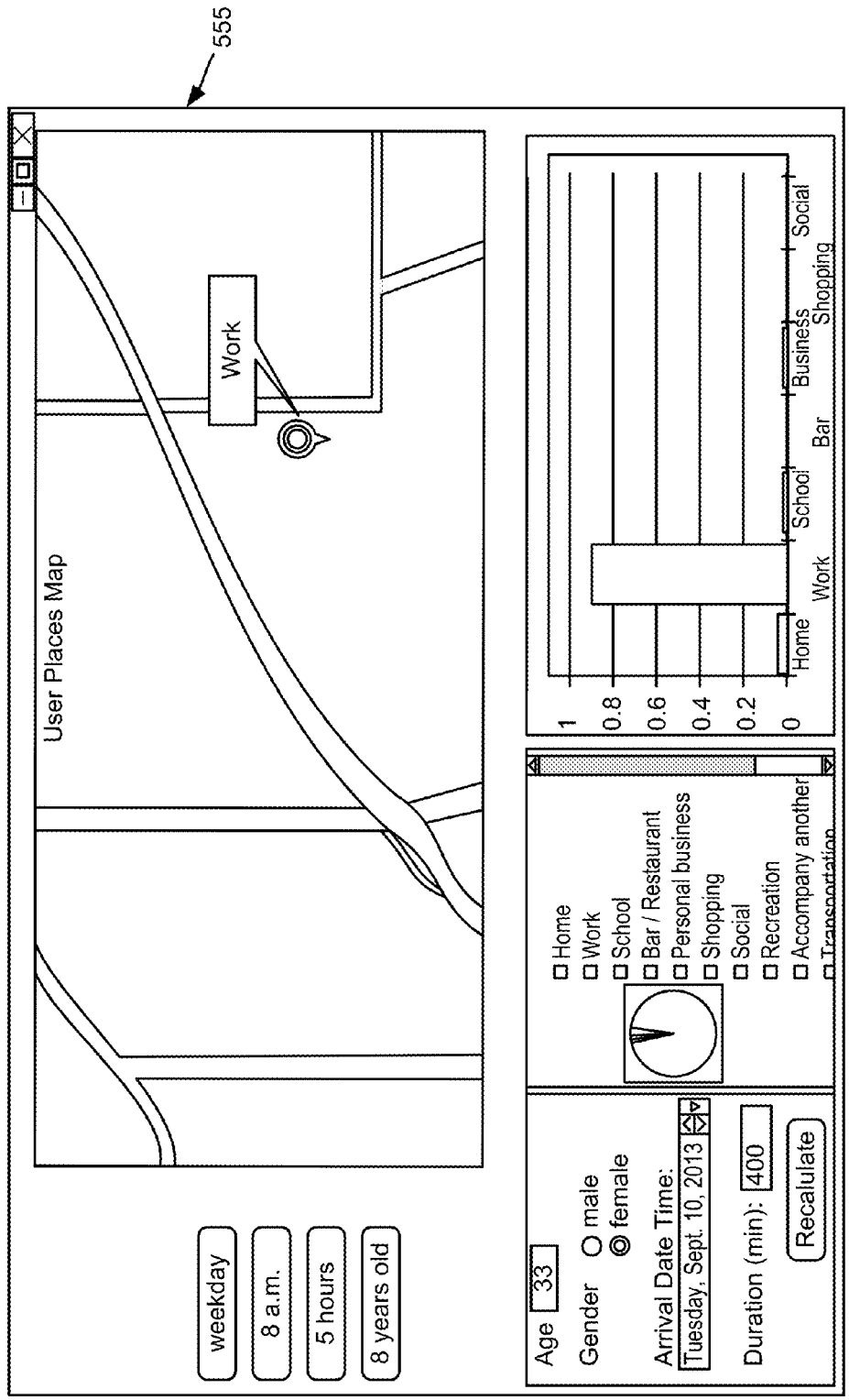

FIGS. 4 and 5 show an example user interface display 444 and 555, respectively, each including a semantically labeled location on a map. In FIG. 4, the subject is eight years old; in FIG. 5, the subject is thirty-three years old. As can be seen, the age of the subject, input as a feature to the classifier, significantly changes the probabilities. More particularly, in this example, the eight year old person is classified as being most likely at school. At the same location at the same time, the thirty-three year old person is classified as being most likely at work. This computed inference is logical, given that the eight year old is more likely a student and the thirty-three year old is more likely a teacher or other employee of the school.

Thus, the same place sometimes is (correctly) labeled differently for different people. In the above example, one person's school is someone else's workplace. The classifier determines this based upon each individual's demographics and visits to each place, allowing the same place to have different labels for different people. Note that the same place may have different roles depending on the time of day, which also may factor into the classification.

In another aspect, most people tend to follow certain sequences of visits, rather than picking their next location completely at random. For instance, many people go directly home after work. As described herein, such a bias may be exploited to help label a sequence of visits, and/or to extract sequence-based features.

Figure 6:
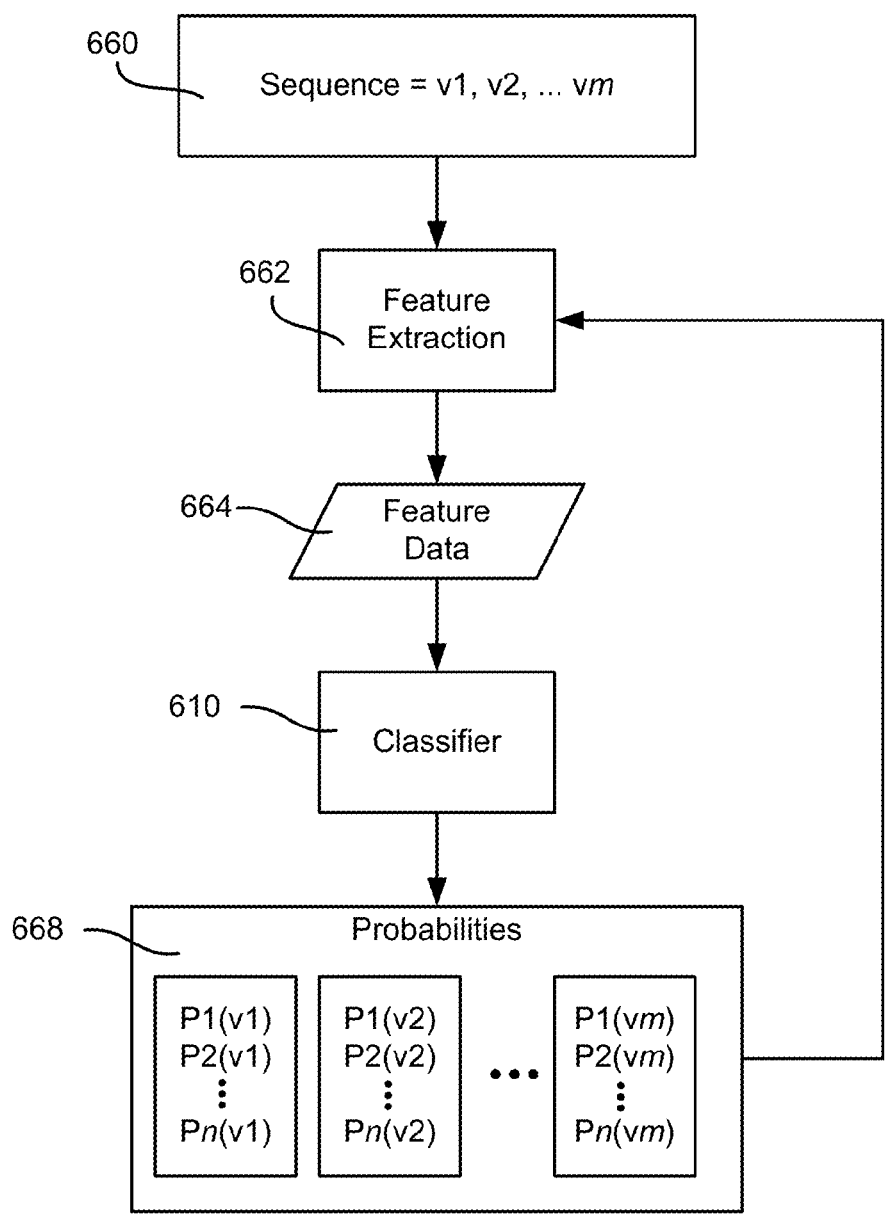
FIG. 6 is an example representation related to the use of sequence data of a sequence of visits in determining semantic labels, according to one or more example implementations.

FIG. 6 shows how data of a sequence 660 of visits v1-vm may be used in a labeling classification process. As before, via feature extraction 662, feature data 664 may be extracted/computed from the individual visit data as well as from the sequences. The classifier 610 outputs a set of probabilities 668 for each visit, which in this example is n probabilities (however it is understood that each visit may have a different number of probabilities, and some threshold level may be used to eliminate very low ones).

As can be readily appreciated, the results given in one set of probabilities may be used as additional features that may change the labeling of the visits if the classification is re-run with these additional features. For example, if after a first iteration v2 is classified as eighty percent the gym, fifteen percent children's daycare facility and so on, and this information is used to provide additional features, then previous and subsequent visits' probabilities in the sequence may change in a next iteration, and so on. This may lead to too much data to ever converge on a definite label for each visit, so some limiting (e.g., based upon a fixed number of candidates such as fifty and some maximum number of iterations) or the like may be used.

With respect to features, the following example, non-limiting features (not all of which need be used) may be extracted for each cluster to classify the features into a semantic label as described herein.
Features for Machine Learning:
 1. Egocentric features—these include the person/visit related features that used for the ATUS data, including:
  age of person
  gender of person
  arrival day of week (Sunday, Monday, . . . )
  arrival time of day
  visit midpoint time of day
  visit departure time of day
  visit duration
  holiday (yes or no)
  season of year (0, 1, 2, 3)
 Egocentric features also may include some number of (e.g., sixty) nearby business features that may be computed from the latitude/longitude available in the PSRC dataset.

Figure 7:
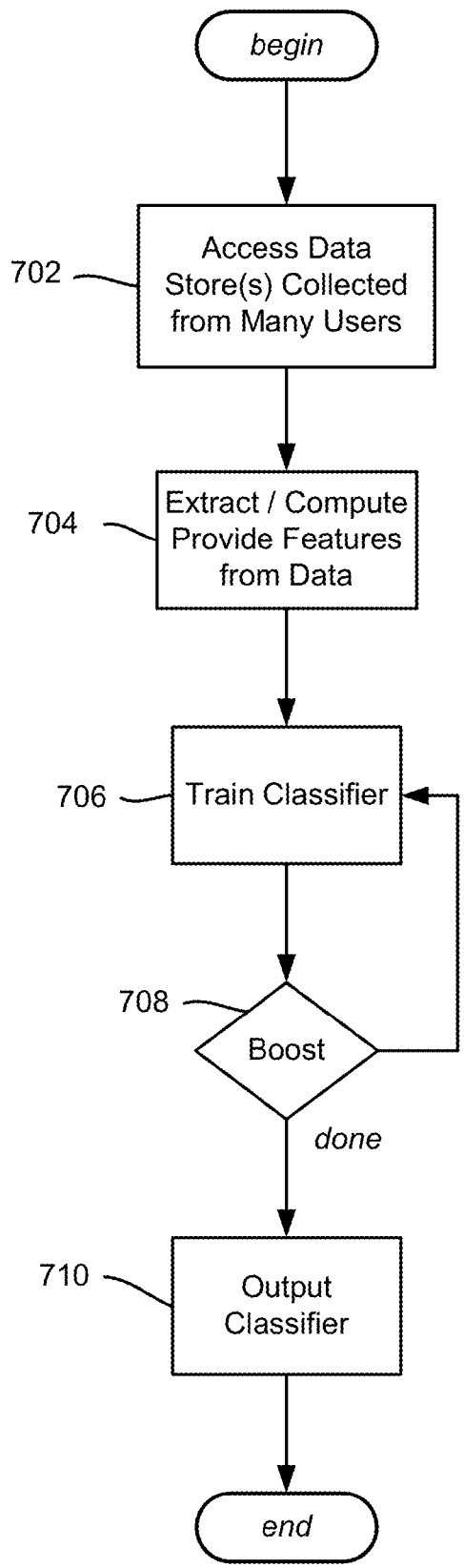
FIG. 7 is a flow diagram illustrating example steps that may be used for training a semantic place label classifier using machine learning, according to one or more example implementations.

The above features may be used in machine training, and are also applicable to the individual user data. For the individual user data, egocentric features also may include features exemplified with respect to FIG. 3, e.g., credit card swipe information, calendar information, other sensor data, and so on, as these types of features relate to the specific user at the specific place.
 2. Sequence features—provide a set of features for each candidate sequence, and may include:
  Sequence probability—the sum of the logs of the individual probabilities of each element of the sequence, computed from the decision tree that works on the visit features.
  Periodicity—the average probability of being at the same type of place +/−24 hours from now.
  Place Type Fractions—the fraction of visits to a place type out of all visits. One fraction for each place type; e.g. "home" may make up 30% of the visits, and "bank" may up 5% of the visits.
  Same Place Different Location—for each place type, the number of locations with that place type for the user. For instance, the user may have two different "home" locations and three different "work" locations.
  Place-to-Place—Given a place type, how often does another place type follow it? For instance, given "home", how often is it followed by "work"? The feature may be computed by counting the number of "home" visits. Then compute the number of "home"-"work" pairs. The feature is the number of pairs divided by the number of "home" visits. Do this for every place type.
  Place Type Duration—the duration fraction of the whole sequence for each place type; e.g. a user may spend 55% of his time at a "home" visit.
  Place Pairs—for example whether both "work" and "school" occur in the sequence. In one implementation this is a binary feature, one for each possible pair of different labels, and the order of visits does not matter.
 3. Crowd Label Features—these features look at what labels other people have given to a place, and may include:
  Most frequent label given to this place
  Number of votes received by the most frequent label
  Average duration of the most frequently given label at this place FIG. 7 is a flow diagram including example steps that summarize aspects of training the classifier, beginning at step 702 which represents accessing the training dataset or datasets collected from many users. This may include data from one or more previous diaries, feedback data received from users, and newer data from participants.

Step 704 extracts features from the data. As described above, the data may be used to compute/provide additional features, such as to obtain the features of businesses near a given latitude and longitude.

Steps 706 and 708 train the classifier based upon the feature data, e.g., using boosted decision tree technology. Step 710 outputs the classifier for use, e.g., to a mobile device such as a cell phone, tablet or other mobile or handheld device, to a cloud service, and so on.

Figure 8:
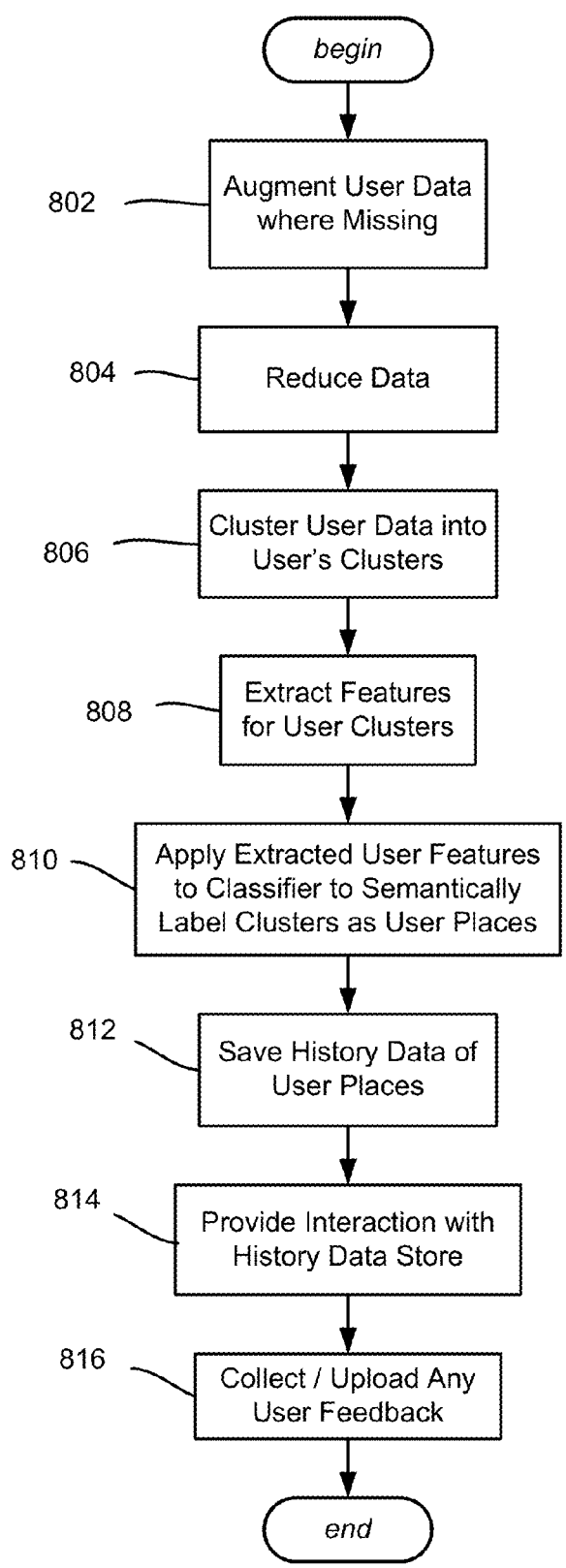
FIG. 8 is a flow diagram illustrating example steps that may be used for processing logged user data to determine semantic place labels, according to one or more example implementations.

FIG. 8 is a flow diagram including example steps that provide an example of processing logged user data into historical data with place labels. As described above, the user data may be preprocessed via steps 802 and 804 to account for times when the logger is off or otherwise not able to get signals, and to reduce the data by eliminating likely non-stationary points, respectively.

Step 806 represents the clustering of points into clusters. Step 808 extracts features corresponding to the clusters, along with other feature data as described herein.

Step 810 uses the features to semantically label the clusters as places. As described above, this may be for each individual visit, or sequences of visits. Step 812 saves the historical visit-related data as desired, such as for interaction therewith (step 814). Step 816 represents the user uploading any feedback, such as to a suitable site or service, e.g., from an application having the user interface with which the user interacts. Note that feedback may be when errors occur, and/or to confirm correctness of the labeling, and/or the user may provide data in general to help grow the overall datasets for improved inference accuracy.

Figure 9:
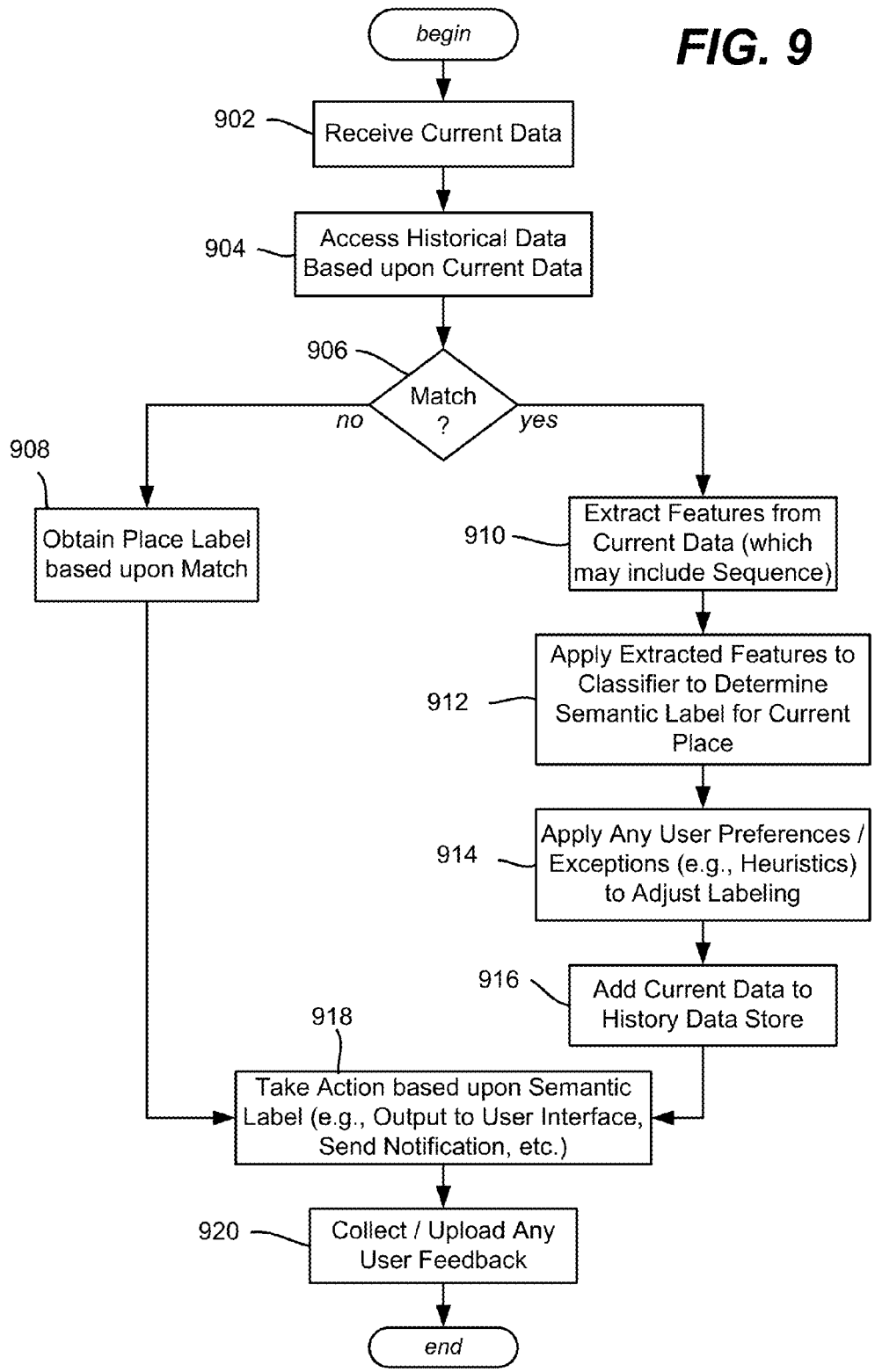
FIG. 9 is a block diagram representing example steps that may be used for determination of a semantic label for current data, according to one or more example implementations.

FIG. 9 is a flow diagram including example steps that summarize aspects of online usage of the classifier with current data, beginning at step 902 where the current data is received. Via steps 904 and 906, the current data is evaluated to determine whether it has been previously labeled; (note that the user may interact with representations of the historical data to only save correct labels, override erroneous labels, remove unwanted labels, and so on). If a match exists, step 908 is performed to obtain the place label for the current data and associate it therewith.

If there is not a match, steps 910 and 912 use the classifier to infer a label. Step 914 applies any preferences/exceptions to the label, e.g., "re-label [Joe's Tavern] as [the public library]" or the like. Step 914 adds the current data and label to the history data store.

Step 918 represents using the label in some way to take an action, e.g., output the label to a user interface, send a notification, interpret a received notification, change the state of some device or devices (e.g., change a device ringtone, turn off Bluetooth®, unlock the front door, turn on the house lights and/or the like). Step 920 represents collecting any user feedback as generally described herein.

As can be seen, automatic semantic place labeling based upon machine learning trained classifiers provides any number of user benefits. The classifier may be used to process previously logged user data, as well as classify current data as needed. Various user-centric features, sequences of visits, and/or features corresponding to data given by others may be used in training the classifier and later by the classifier when classifying a visit to associate a place label therewith.

Example Operating Environment

Figure 10:
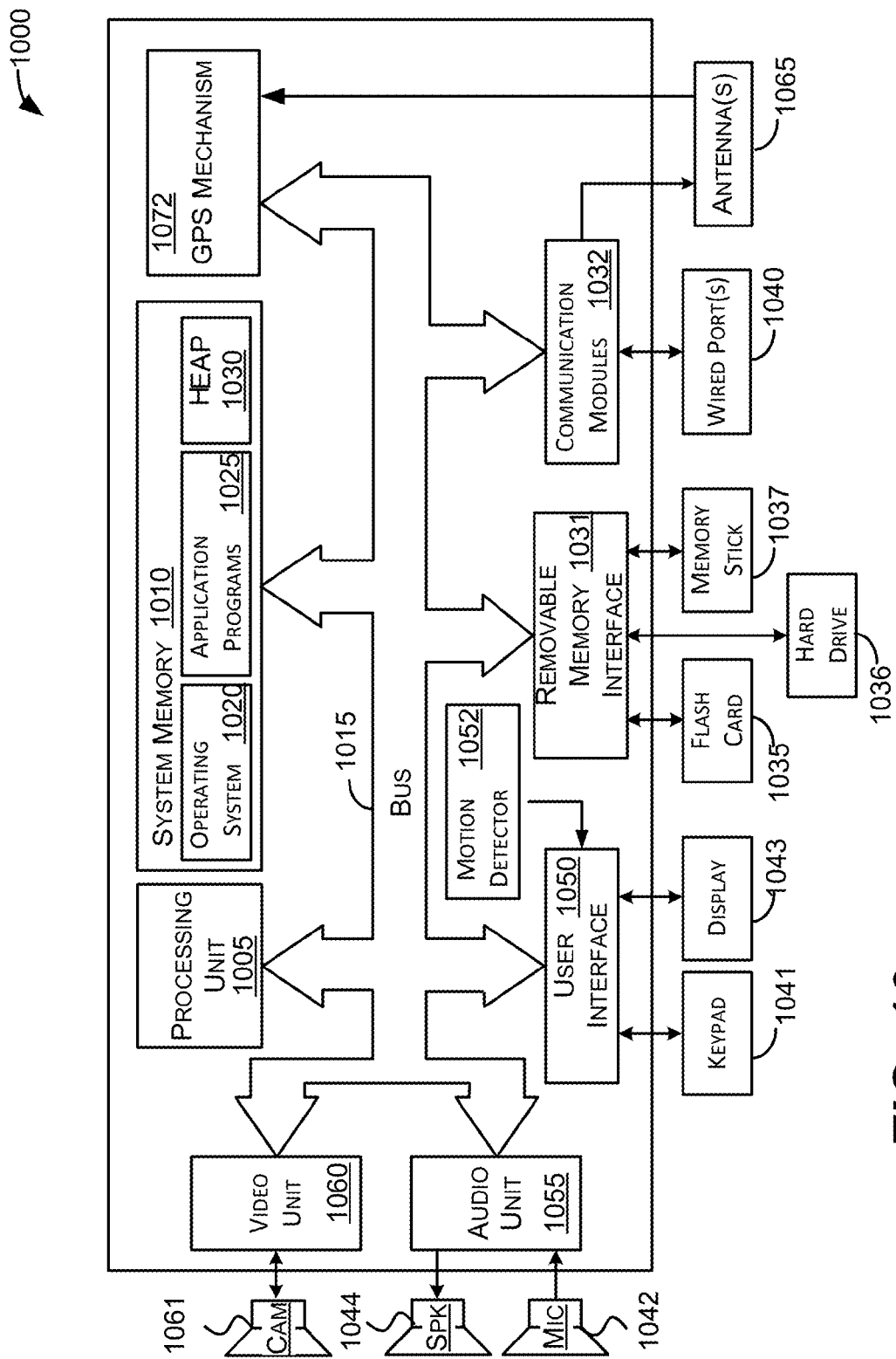
FIG. 10 is a block diagram representing an exemplary non-limiting computing system or operating environment, in the form of a mobile and/or handheld computing and/or communications device, into which one or more aspects of various embodiments described herein can be implemented.

FIG. 10 illustrates an example of a suitable mobile device 1000 on which aspects of the subject matter described herein may be implemented. The mobile device 1000 is only one example of a device and is not intended to suggest any limitation as to the scope of use or functionality of aspects of the subject matter described herein. Neither should the mobile device 1000 be interpreted as having any dependency or requirement relating to any one or combination of components illustrated in the example mobile device 1000. The mobile device may comprise a hand-held device such as a smartphone, tablet, laptop and so on.

With reference to FIG. 10, an example device for implementing aspects of the subject matter described herein includes a mobile device 1000. In some embodiments, the mobile device 1000 comprises a cell phone, a handheld device that allows voice communications with others, some other voice communications device, or the like. In these embodiments, the mobile device 1000 may be equipped with a camera for taking pictures, although this may not be required in other embodiments. In other embodiments, the mobile device 1000 may comprise a personal digital assistant (PDA), hand-held gaming device, notebook computer, printer, appliance including a set-top, media center, or other appliance, other mobile devices, or the like. In yet other embodiments, the mobile device 1000 may comprise devices that are generally considered non-mobile such as personal computers, servers, or the like.

Components of the mobile device 1000 may include, but are not limited to, a processing unit 1005, system memory 1010, and a bus 1015 that couples various system components including the system memory 1010 to the processing unit 1005. The bus 1015 may include any of several types of bus structures including a memory bus, memory controller, a peripheral bus, and a local bus using any of a variety of bus architectures, and the like. The bus 1015 allows data to be transmitted between various components of the mobile device 1000.

The mobile device 1000 may include a variety of computer-readable/machine-readable media. Such media can be any available media that can be accessed by the mobile device 1000 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 1000.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 1010 includes computer storage media in the form of volatile and/or nonvolatile memory and may include read only memory (ROM) and random access memory (RAM). On a mobile device such as a cell phone, operating system code 1020 is sometimes included in ROM although, in other embodiments, this is not required. Similarly, application programs 1025 are often placed in RAM although again, in other embodiments, application programs may be placed in ROM or in other computer-readable memory. The heap 1030 provides memory for state associated with the operating system 1020 and the application programs 1025. For example, the operating system 1020 and application programs 1025 may store variables and data structures in the heap 1030 during their operations.

The mobile device 1000 may also include other removable/non-removable, volatile/nonvolatile memory. By way of example, FIG. 10 illustrates a flash card 1035, a hard disk drive 1036, and a memory stick 1037. The hard disk drive 1036 may be miniaturized to fit in a memory slot, for example. The mobile device 1000 may interface with these types of non-volatile removable memory via a removable memory interface 1031, or may be connected via a universal serial bus (USB), IEEE 10394, one or more of the wired port(s) 1040, or antenna(s) 1065. In these embodiments, the removable memory devices 1035-437 may interface with the mobile device via the communications module(s) 1032. In some embodiments, not all of these types of memory may be included on a single mobile device. In other embodiments, one or more of these and other types of removable memory may be included on a single mobile device.

In some embodiments, the hard disk drive 1036 may be connected in such a way as to be more permanently attached to the mobile device 1000. For example, the hard disk drive 1036 may be connected to an interface such as parallel advanced technology attachment (PATA), serial advanced technology attachment (SATA) or otherwise, which may be connected to the bus 1015. In such embodiments, removing the hard drive may involve removing a cover of the mobile device 1000 and removing screws or other fasteners that connect the hard drive 1036 to support structures within the mobile device 1000.

The removable memory devices 1035-437 and their associated computer storage media, discussed above and illustrated in FIG. 10, provide storage of computer-readable instructions, program modules, data structures, and other data for the mobile device 1000. For example, the removable memory device or devices 1035-437 may store images taken by the mobile device 1000, voice recordings, contact information, programs, data for the programs and so forth.

A user may enter commands and information into the mobile device 1000 through input devices such as a key pad 1041 and the microphone 1042. In some embodiments, the display 1043 may be touch-sensitive screen and may allow a user to enter commands and information thereon. The key pad 1041 and display 1043 may be connected to the processing unit 1005 through a user input interface 1050 that is coupled to the bus 1015, but may also be connected by other interface and bus structures, such as the communications module(s) 1032 and wired port(s) 1040. Motion detection 1052 can be used to determine gestures made with the device 1000.

A user may communicate with other users via speaking into the microphone 1042 and via text messages that are entered on the key pad 1041 or a touch sensitive display 1043, for example. The audio unit 1055 may provide electrical signals to drive the speaker 1044 as well as receive and digitize audio signals received from the microphone 1042.

The mobile device 1000 may include a video unit 1060 that provides signals to drive a camera 1061. The video unit 1060 may also receive images obtained by the camera 1061 and provide these images to the processing unit 1005 and/or memory included on the mobile device 1000. The images obtained by the camera 1061 may comprise video, one or more images that do not form a video, or some combination thereof.

The communication module(s) 1032 may provide signals to and receive signals from one or more antenna(s) 1065. One of the antenna(s) 1065 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 1072. In turn, the GPS mechanism 1072 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 1000 may connect to one or more remote devices. The remote devices may include a personal computer, a server, a router, a network PC, a cell phone, a media playback device, a peer device or other common network node, and typically includes many or all of the elements described above relative to the mobile device 1000.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, the method comprising:
   receiving feature data corresponding to location-related information of an individual visit, the location-related information associated with a first computing device, the feature data including user demographics data of a person associated with the first computing device and at least one of arrival day of week, arrival time of day, visit midpoint time of day, departure time of day, duration of visit, season of year, holiday data, and nearby business features;
   computing an inference of a semantic label for a place represented by the location-related information for the individual visit using a semantic label classifier and the received feature data, the inference of the semantic label based at least in part on the user demographics data, such that the inferred semantic label for the place is customized to the person associated with the user demographics data and the individual visit; and
   associating the inferred semantic label with the place represented by the location-related information for the individual visit; and
   automatically performing an action at the first computing device or at another computing device based on the inferred semantic label.

2. The method of claim 1 wherein providing the feature data comprises providing sequence-related feature data to the classifier.

3. The method of claim 1 wherein associating the inferred semantic label with the place represented by the location-related information comprises inferring the semantic label for an individual visit of at least two visits of a sequence of visits.

4. The method of claim 1 wherein performing the action based on the inferred semantic label further comprises:
   taking automated action based upon the inferred semantic label, including at least one of: providing the inferred semantic label in association with a notification or presenting the inferred semantic label on a user interface.

5. The method of claim 1 further comprising:
   maintaining the inferred semantic label in association with historical location data.

6. The method of claim 1 wherein computing the inference of the semantic label for the place represented by the location-related information further comprises:
   computing a set of probabilities for individual visits by the person to the place represented by the location-related information, such that an individual inferred semantic label is associated with individual probability data corresponding to the person associated with the user demographic data and an individual visit.

7. The method of claim 1, wherein performing the action comprises changing one or more of a ring tone state of the first computing device, a calendar state of the first computing device, a connectivity state of the first computing device, a security state of a second computing device remote from the first computing device, a power state of the second computing device, or an authentication state of the second computing device.

8. The method of claim 1, further comprising:
   receiving a second inferred semantic label associated with a location of a second computing device; and
   presenting a notification of the location of the second computing device on a user interface of the first computing device.

9. The method of claim 1, further comprising:
   receiving second location-related information associated with a second computing device;
   based on the received second location-related information, obtaining second feature data corresponding to the second location-related information, the second feature data including user demographics data of a second person associated with the second computing device;
   associating a second semantic label with the second location-related information; and
   presenting a notification of the second semantic label on a user interface of the first computing device.

10. The method of claim 1, further comprising:
    receiving user feedback based on the automatically performed action; and
    training the semantic label classifier at least in part using the received user feedback.

11. A system comprising:
    at least one processor; and
    a memory device having computer-executable instructions, the memory device coupled to the at least one processor such that the at least one processor is configured to execute the computer-executable instructions to:
      receive feature data and location-related information corresponding to a visit, the feature data including user demographics data and at least one of arrival day of week, arrival time of day, visit midpoint time of day, departure time of day, duration of visit, season of year, holiday data, and nearby business features;
      compute an inference of a semantic label for a place represented by the location-related information for that visit using a semantic label classifier and the received feature data, the inference of the semantic label based at least in part on the user demographics data, such that the inferred semantic label is customized to a person associated with the user demographics data and that visit;
      label the visit with the inferred semantic label based upon features of the visit; and
      upon labeling the visit with the inferred semantic label, automatically perform an action that corresponds to the inferred semantic label.

12. The system of claim 11, wherein the received feature data further comprises at least one of: payment-related information, device sensor data, external data, calendar data, communication data, or personal identification credentials data.

13. The system of claim 11, wherein at least some of the features of the visit are based upon a sequence of visits.

14. The system of claim 11, wherein at least some of the features of the visit are based upon crowd label-related features.

15. The system of claim 11 wherein the semantic label classifier includes or is coupled to user preference information or user exception information, or both user preference information and user exception information.

16. The system of claim 11 wherein the semantic label classifier comprises a boosted decision tree classifier.

17. One or more computer-readable storage devices having computer-executable instructions, which upon execution perform operations, comprising:

obtaining feature data associated with a plurality of location-related data corresponding to a plurality of visits associated with a user, the feature data including user demographics data and at least one of arrival day of week, arrival time of day, visit midpoint time of day, departure time of day, duration of visit, season of year, holiday data, and nearby business features;

classifying the location-related data corresponding to at least one visit into semantic label data for that visit based at least in part on the user demographic data and one or more other data from the feature data;

assigning a semantic label to the location-related data for that visit using the semantic label data; and automatically performing an action that corresponds to the assigned semantic label, the action performed at a computing device associated with the user or at a computing device remote from the user.

18. The one or more computer-readable storage devices of claim 17 wherein the plurality of visits corresponds to a sequence of visits, and wherein classifying the location-related data comprises iteratively using probability data of an earlier classification iteration to determine at least one semantic label of a later classification iteration.

19. The one or more computer-readable storage devices of claim 18 wherein obtaining the feature data comprises determining at least one of: sequence probability data, sequence periodicity data, sequence place type data, sequence place following data, sequence place type duration data or sequence place pairing data.

* * * * *